United States Patent
Baboukani et al.

(10) Patent No.: US 10,676,357 B1
(45) Date of Patent: Jun. 9, 2020

(54) BIPOLAR EXFOLIATION OF BLACK PHOSPHOROUS INTO PHOSPHORENE

(71) Applicants: Amin Rabiei Baboukani, Miami, FL (US); Iman Khakpour, Miami, FL (US); Chunlei Wang, Miami, FL (US)

(72) Inventors: Amin Rabiei Baboukani, Miami, FL (US); Iman Khakpour, Miami, FL (US); Chunlei Wang, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/361,332

(22) Filed: Mar. 22, 2019

(51) Int. Cl.
```
C01B 25/02      (2006.01)
C25B 9/06       (2006.01)
C25B 1/00       (2006.01)
C25B 15/02      (2006.01)
C01B 25/00      (2006.01)
B82Y 30/00      (2011.01)
B82Y 40/00      (2011.01)
```
(52) U.S. Cl.
CPC ............ *C01B 25/02* (2013.01); *C01B 25/003* (2013.01); *C25B 1/00* (2013.01); *C25B 9/063* (2013.01); *C25B 15/02* (2013.01); *B82Y 30/00* (2013.01); *B82Y 40/00* (2013.01); *C01P 2002/01* (2013.01); *C01P 2002/20* (2013.01); *C01P 2002/70* (2013.01); *C01P 2002/82* (2013.01)

(58) Field of Classification Search
CPC .............................. C01B 25/02; C01B 25/003
See application file for complete search history.

(56) References Cited

U.S. PATENT DOCUMENTS

2018/0186645 A1* 7/2018 Xu .................. C09K 11/00

OTHER PUBLICATIONS

Mayorga-Martinez et al., "Black Phosphorus Nanoparticle Labels for Immunoassays via Hydrogen Evolution Reaction Mediation," Anal. Chem. 2016, 88, 10074-10079 (Year: 2016).*

* cited by examiner

*Primary Examiner* — Nicholas A Smith
(74) *Attorney, Agent, or Firm* — Saliwanchik, Lloyd & Eisenschenk

(57) ABSTRACT

A single-step, in situ bipolar exfoliation system, and methods for exfoliations of multi-layer bulk black phosphorous into single-layer (two-dimensional), few-layer, or even nano-platelets phosphorene are provided. The bipolar exfoliation system can include: a first driving electrode; a second driving electrode electrically connected to the first driving electrode through an external power supply; at least one bipolar electrode comprising multi-layer bulk black phosphorous; and a solvent in physical contact with the first driving electrode, the second driving electrode, and the at least one bipolar electrode. The system can be configured such that the electric conditions between the first and second driving electrodes can be used to turn one end of the at least one bipolar electrode into an anodic pole and the other end of the at least one bipolar electrode into a cathodic pole such that the multi-layer black phosphorous is exfoliated into the single-layer, few-layer, or nano-platelets phosphorene.

20 Claims, 5 Drawing Sheets

BIPOLAR EXFOLIATION OF BLACK PHOSPHOROUS INTO PHOSPHORENE

BACKGROUND

Among two-dimensional (2D) materials that recently have attracted great interest, black phosphorus (BP) is gaining a rising popularity owing to its unique structure and intriguing anisotropic properties, which are rarely found in other 2D materials. Apart from its anisotropic structure, BP shows a layer dependent bandgap, which can be tuned from 0.3 eV to 2 eV with decreasing thickness from bulk BP to single-layer BP, which is also known as phosphorene.

BP can be prepared from white or red phosphorous at high temperature and under high pressure. BP crystal is composed of puckered-honeycomb layers stacked by weak van der Waals interactions, giving the possibility of preparing phosphorene via different exfoliation methods. A number of top-down methods such as sonication-assisted liquid exfoliations in different solvents, plasma-assisted treatment, mechanical approaches, and bottom-up synthetic methods can be used for the exfoliation of BP.

In recent years, bipolar electrochemistry has grown extensively in applications such as exfoliations of bulk graphite to single-layer two-dimensional graphene. Unlike a conventional two-electrode or three-electrode electrochemical cell in which each electrode is directly connected to a potential source, a bipolar cell has a bipolar electrode placed in a solvent between two driving electrodes. Despite that, the bipolar electrode itself is not electrically connected to the power supply, and the electric field between the driving electrodes drives reactions on the two ends of the bipolar electrode such that one end of the bipolar electrode can act as the anodic pole where molecules are oxidized on the electrode and the other end can act as the cathodic pole where molecules are reduced and the redox reactions occur in the bath.

BRIEF SUMMARY

There continues to be a need in the art for improved designs and techniques for a bipolar exfoliation system and methods for producing single-layer (two-dimensional), few-layer or even nano-platelets phosphorene from bulk black phosphorous.

Embodiments of the subject invention provide bipolar exfoliation systems and methods for single-step, in situ exfoliations of multi-layer bulk black phosphorous into single-layer (two-dimensional) or few-layer or even nano-platelets phosphorene, and for simultanously depositing the phosporene on a conducting substrate.

In an embodiment, a bipolar exfoliation system for single-step, in situ exfoliations of multi-layer bulk black phosphorous into single-layer (two-dimensional) or few-layer or even nano-platelets phosphorene can comprise: a first driving electrode; a second driving electrode electrically connected to the first driving electrode through an external power supply; at least one bipolar electrode comprising multi-layer bulk black phosphorous; and a solvent in physical contact with the first driving electrode, the second driving electrode, and the at least one bipolar electrode.

In another embodiment, a method of single-step, in situ exfoliation of multi-layer bulk black phosphorous into single-layer (two-dimensional) or few-layer or even nano-platelets phosphorene can comprise providing a bipolar exfoliation system, the system comprising: a first driving electrode; a second driving electrode electrically connected to the first driving electrode through an external power supply, at least one bipolar electrode comprising the multi-layer bulk black phosphorous; and a solvent in physical contact with the first driving electrode, the second driving electrode, and the at least one bipolar electrode. The method can further comprise configuring electric conditions between the first driving electrode and the second driving electrode such that one end of the at least one bipolar electrode is turned into an anodic pole and the other end of the at least one bipolar electrode is turned into a cathodic pole such that the multi-layer black phosphorous is exfoliated into the single-layer or few-layer or even nano-platelets phosphorene.

In another embodiment, a method of single-step, in situ exfoliation of multi-layer bulk black phosphorous into single-layer (two-dimensional) or few-layer phosphorene or even nano-platelets can comprise providing a bipolar exfoliation system, the system comprising: a first driving electrode; a second driving electrode electrically connected to the first driving electrode through an external power supply; at least one bipolar electrode comprising the multi-layer bulk black phosphorous; and a solvent in physical contact with the first driving electrode, the second driving electrode, and the at least one bipolar electrode. The method can further comprise configuring electric conditions between the first driving electrode and the second driving electrode such that one end of the at least one bipolar electrode is turned into an anodic pole and the other end of the at least one bipolar electrode is turned into a cathodic pole such that the multi-layer black phosphorous is exfoliated into the single-layer or few-layer or even nano-platelets phosphorene, and the configuring of the electric conditions can comprise: configuring a magnitude of an electric field between the first driving electrode and the second driving electrode; configuring a direction of the electric field relative to the at least one bipolar electrode between the first driving electrode and the second driving electrode; configuring a potential between the first driving electrode and the second driving electrode; and configuring a distance between the first driving electrode and the second driving electrode. The at least one bipolar electrode can be physically separated from, and not in physical contact with, the external power supply. The solvent can be deionized water having a predetermined resistivity. Molecules of the solvent can be oxidized at the anodic pole of the at least one bipolar electrode and reduced at the cathodic pole of the at least one bipolar electrode, and two faradaic reactions can occur at the anodic pole and the cathodic pole, respectively, of the at least one bipolar electrode. The at least one bipolar electrode can comprise a plurality of bipolar electrodes, and each bipolar electrode of the plurality of bipolar electrodes can be simultaneously controlled by the electric conditions between the first driving electrode and second driving electrode.

DETAILED DESCRIPTION

Embodiments of the subject invention provide bipolar exfoliation systems and methods for single-step, in situ exfoliations of multi-layer bulk black phosphorous into single-layer (two-dimensional) or few-layer or even nano-platelets phosphorene.

When the term "approximately" or "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1.

Figure 1:
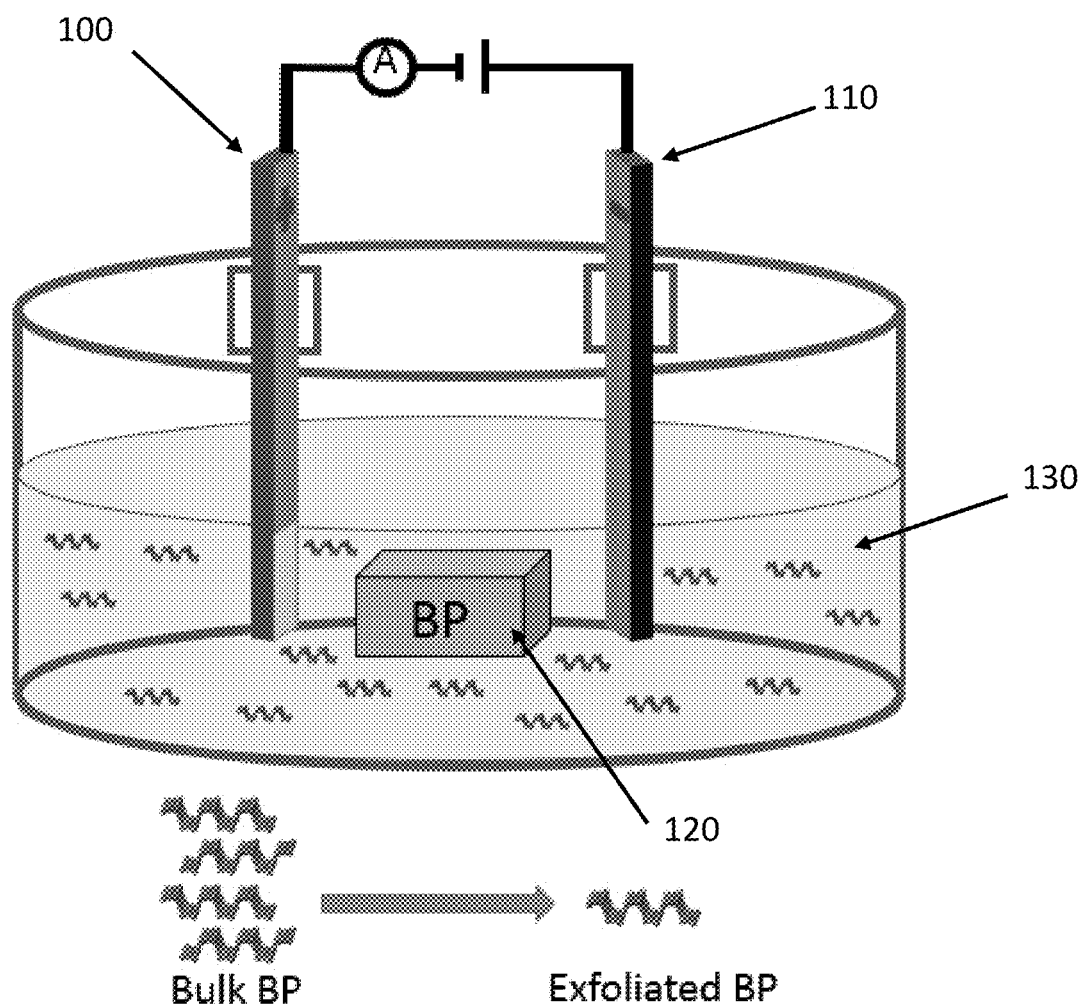
FIG. 1 is a schematic diagram of a bipolar exfoliation system for single-step, in situ exfoliations of multi-layer bulk black phosphorous into single-layer (two-dimensional) or few-layer or even nano-platelets phosphorene, according to an embodiment of the subject invention.

FIG. 1 shows a schematic diagram of a bipolar exfoliation system for single-step, in situ exfoliations of multi-layer bulk black phosphorous into single-layer (two-dimensional) or few-layer or even nano-platelets phosphorene, according to an embodiment of the subject invention. Referring to FIG. 1, the bipolar exfoliation system can comprise: a first driving electrode 100; a second driving electrode 110 electrically connected to the first driving electrode through an external power supply; at least one bipolar electrode 120 comprising multi-layer bulk black phosphorous; and a solvent 130 contacting the first driving electrode 100, the second driving electrode 110, and the at least one bipolar electrode 120.

The first driving electrode 100 can be an anode where oxidation reactions takes place, while the second driving electrode 110 can be a cathode where reduction reactions takes place, or vice versa. The first driving electrode 100 and the second driving electrode 110 can be spaced apart from each other by a predetermined distance, with the at least one bipolar electrode 120 being positioned between the two driving electrodes 100 and 110 in a horizontal direction.

In an embodiment, the solvent 130 can be deionized (DI) water with or without salts of a predetermined resistivity contained in a sealed container or any suitable container.

In an embodiment, one or both of the first driving electrode 100 and the second driving electrode 110 can be made of stainless steel or any other suitable conductive substrates.

In an embodiment, an electric field can be set between the first driving electrode 100 and second driving electrode 110. The electric field can be created by applying a voltage difference between the two driving electrodes 100 and 110, inducing a polarization of the at least one bipolar electrode 120. As a result, one end of the at least one bipolar electrode 120 comprising multi-layer bulk black phosphorous is turned into an anodic pole and the other end of the at least one bipolar electrode 120 is turned into a cathodic pole. The molecules of the solvent are then oxidized at the anodic pole of the at least one bipolar electrode 120 comprising multi-layer bulk black phosphorous while the molecules of the solvent are reduced at the cathodic pole of the at least one bipolar electrode 120 comprising multi-layer bulk black phosphorous. Thus, two faradaic reactions occure at the two ends of the at least one bipolar electrode 120, respectively.

In embodiments of the subject invention, parameters of the electric field set between the first driving electrode 100 and second driving electrode 110 can be configured and adjusted in order for the multi-layer black phosphorous of at least one bipolar electrode 120 to be exfoliated into a plurality of single-layer (two-dimensional) or few-layer or even nano-platelets phosphorene.

In an embodiment, a magnitude of the electric field can be configured or adjusted such that the multi-layer black phosphorous of the at least one bipolar electrode 120 can be exfolidated into a plurality of single-layer (two-dimensional) or few-layer or even nano-platelets phosphorene.

In another embodiment, a direction of the electric field can be configured or adjusted such that the multi-layer black phosphorous of the at least one bipolar electrode 120 can be exfoliated into a plurality of single-layer (two-dimensional) or few-layer or even nano-platelets phosphorene.

In another embodiment, a potential between the first driving electrode 100 and the second driving electrode 110 can be configured or adjusted such that the multi-layer black phosphorous of the at least one bipolar electrode 120 can be exfoliated into a plurality of single-layer (two-dimensional) or few-layer or even nano-platelets phosphorene.

In another embodiment, the distance (e.g., horizontal distance, or greatest distance) between the first driving electrode 100 and the second driving electrode 110 can be configured or adjusted such that the multi-layer black phosphorous of the at least one bipolar electrode 120 can be exfoliated into a plurality of single-layer (two-dimensional) or few-layer or even nano-platelets phosphorene.

In an embodiment, the resistivity of the solvent between the first driving electrode 100 and the second driving electrode 110 can be configured or adjusted such that the multi-layer black phosphorous of the at least one bipolar electrode 120 can be exfoliated into a plurality of single-layer (two-dimensional) or few-layer or even nano-platelets phosphorene.

In an embodiment, a size such as a length, a width, or a depth of the at least one bipolar electrode comprising multi-layer bulk black phosphorous is configured such that the multi-layer black phosphorous is exfoliated into the single-layer (two-dimensional) or few-layer or even nano-platelets phosphorene.

In an embodiment, a length of the at least one bipolar electrode comprising multi-layer bulk black phosphorous is configured to be 7 millimeters (mm) or about 7 mm or any other suitable dimensions.

In an embodiment, a temperature of the solvent contacting the first driving electrode, the second driving electrode, and the at least one bipolar electrode is configured such that the multi-layer black phosphorous is exfoliated into the single-layer (two-dimensional) or few-layer or even nano-platelets phosphorene.

In an embodiment, a temperature of the solvent contacting the first driving electrode, the second driving electrode and the at least one bipolar electrode is configured to be at an appropriate temperature such as at room temperature (e.g., 25° C.).

In an embodiment, the at least one bipolar electrode 120 comprising multi-layer black phosphorous can be wirelessly placed in the solvent without a direct electrical connection with the external power supply.

In an embodiment, the at least one bipolar electrode 120 comprising multi-layer black phosphorous can comprise a plurality of bipolar electrodes each comprising multi-layer black phosphorous. The electric field set between the first driving electrode 100 and second driving electrode 110 can be configured to simultaneously control the exfoliation of each bipolar electrode of the plurality of bipolar electrodes. In another embodiment, the electric field set between the first driving electrode 100 and second driving electrode 110 can be configured to individually control the exfoliation of each bipolar electrode of the plurality of bipolar electrodes.

Figures 2A, 2B:
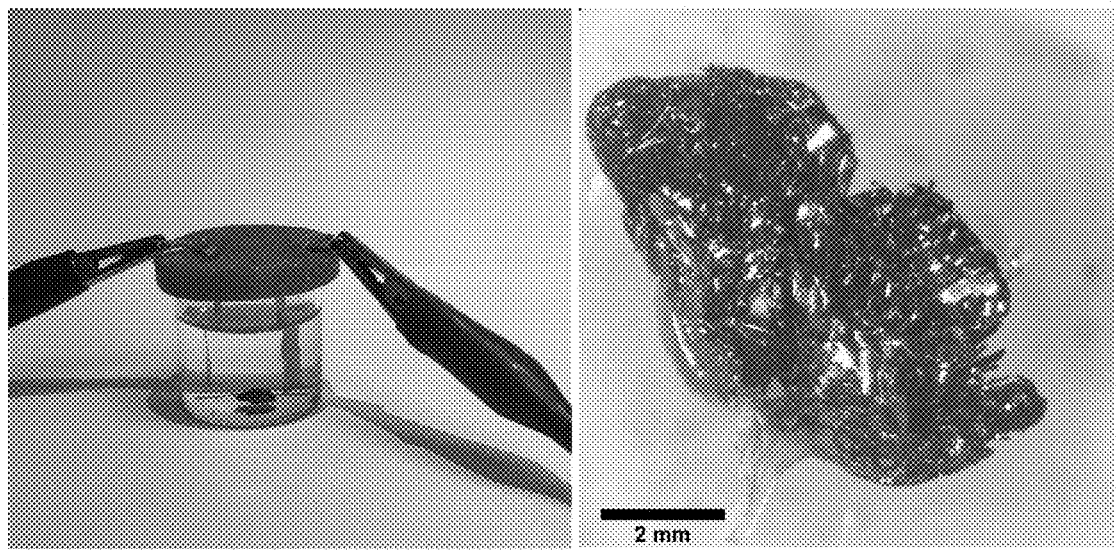
FIG. 2(a) shows an image of a bipolar exfoliation system according to an embodiment of the subject invention.
FIG. 2(b) shows an image of a black phosphorous sample according to an embodiment of the subject invention.

FIG. 2(a) shows an image of a bipolar exfoliation system having deionized (DI) water as the solvent contacting the first driving electrode, the second driving electrode, and the at least one bipolar electrode, according to an embodiment of the subject invention.

FIG. 2(b) shows an image of a black phosphorous sample in deionized (DI) water, where a length of the black phosphorous is measured to be about 7 mm, according to an embodiment of the subject invention.

Characterization of Exfoliated Single-Layer (Two-Dimensional) or Few-Layer Phosphorene Herein, the resulting single-layer (two-dimensional) or few-layer or even nano-platelets phosphorene exfoliated by the bipolar exfoliation system can be characterized by any known characterization methods, such as Zeta potential measurements, Raman spectra spectroscopic study, transmission electron microscopic (TEM) study, and/or selected area (electron) diffraction microscopic (SAD or SAED) study.

Figure 3:
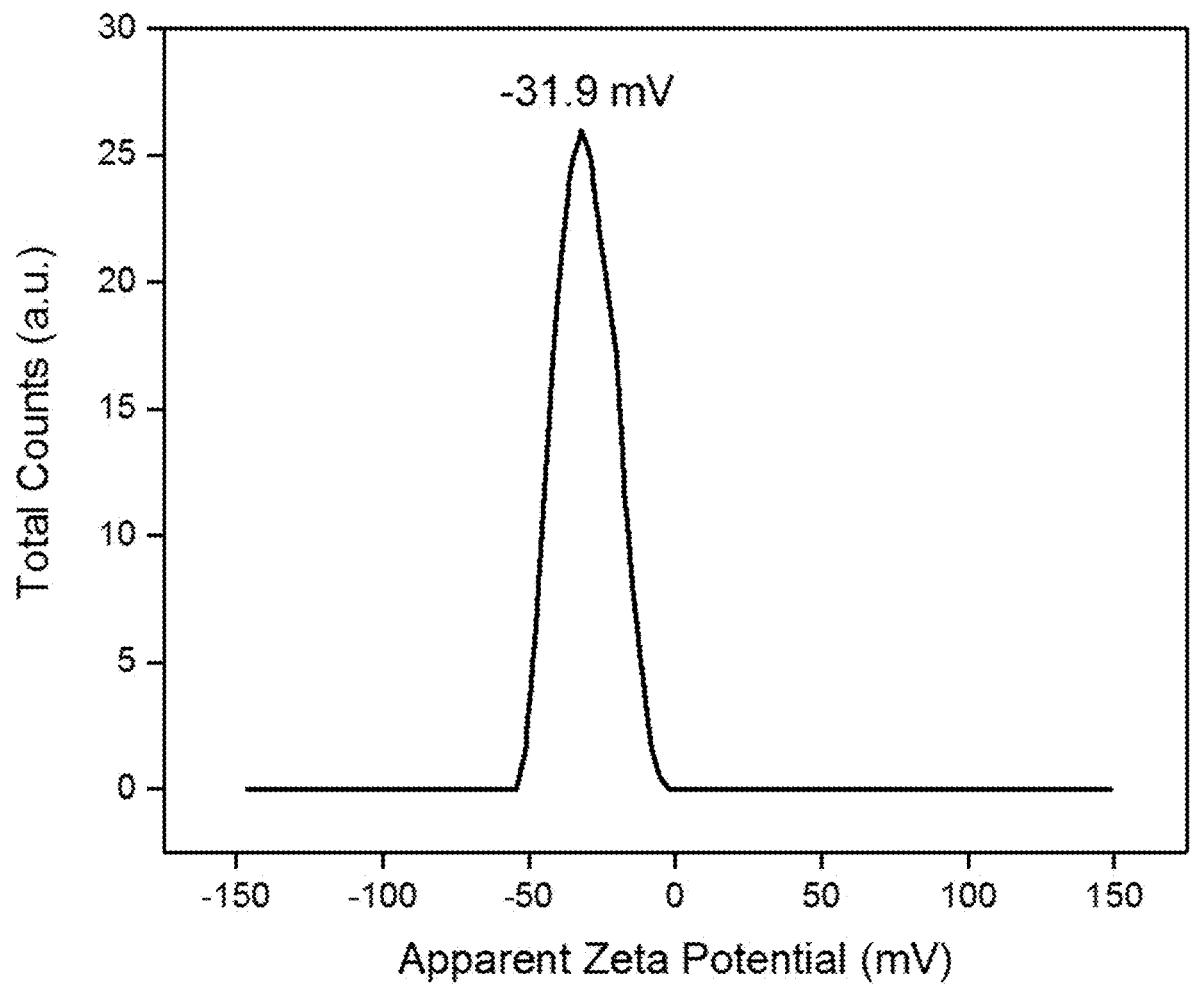
FIG. 3 shows apparent Zeta potential measurements of the exfoliated single-layer (two-dimensional) or few-layer or even nano-platelets phosphorene in deionized (DI) water, according to an embodiment of the subject invention.

FIG. 3 shows Zeta potential measurements of the exfoliated single-layer (two-dimensional) or few-layer or even nano-platelets phosphorene in DI water, according to an embodiment of the subject invention. In FIG. 3, a peak of apparent Zeta potential of about −31.9 milli-Volts (mV) was observed, confirming presence of the negatively charge particles of the single-layer (two-dimensional) or few-layer or even nano-platelets phosphorene in the DI water.

Figure 4:
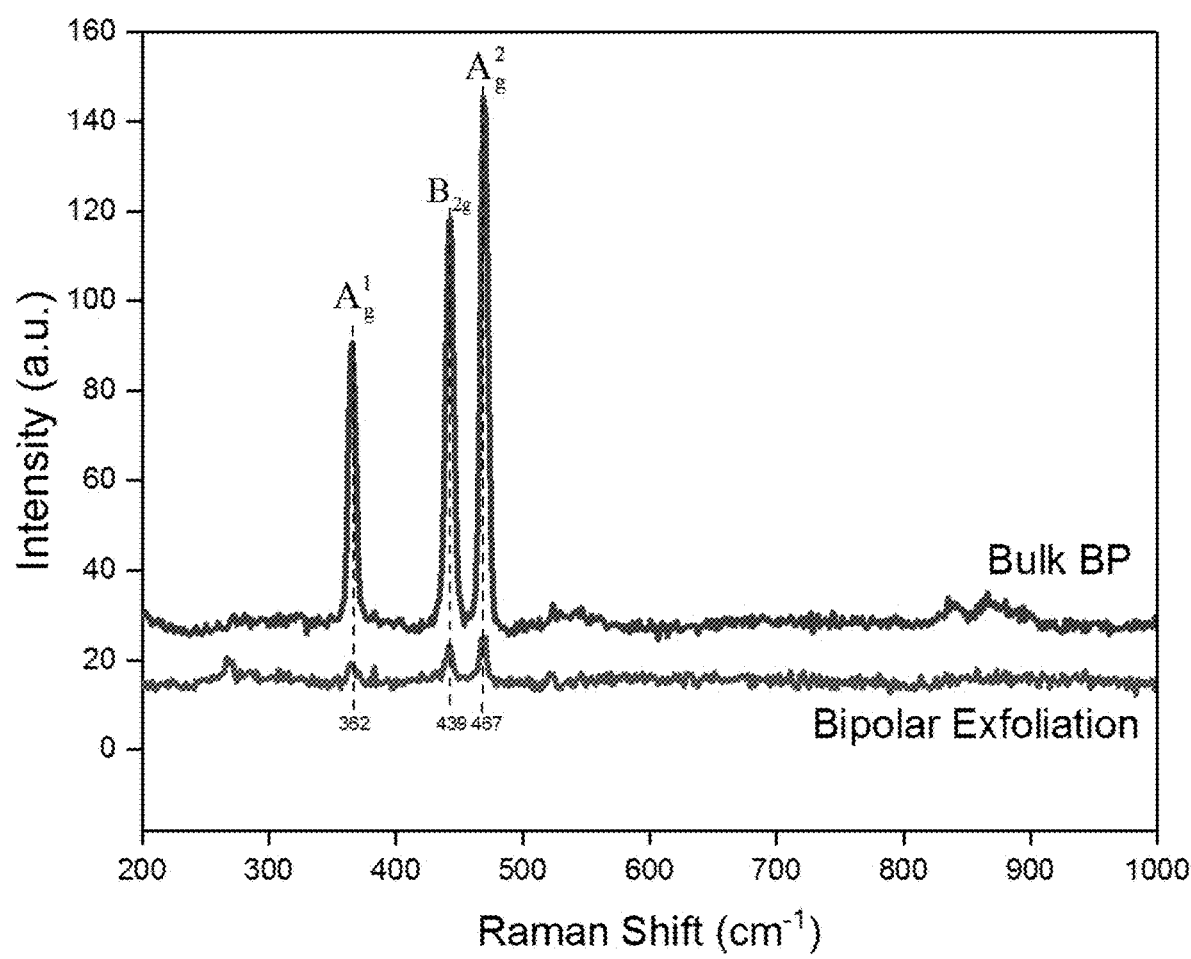
FIG. 4 shows Raman spectra of the multi-layer bulk black phosphorous of at least one bipolar electrode of the bipolar exfoliation system and the resulting single-layer (two-dimensional) or few-layer or even nano-platelets phosphorene exfoliated from the multi-layer bulk black phosphorous, respectively, according to an embodiment of the subject invention.
Figure 5A:
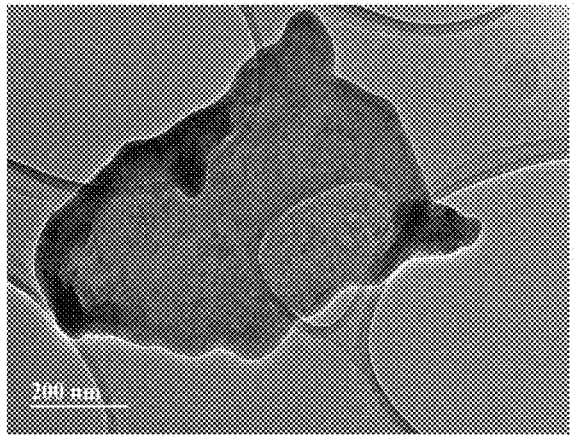
FIGS. 5(a-e) show transmission electron microscopy (TEM) images of the resulting single-layer (two-dimensional) or few-layer or even nano-platelets phosphorene exfoliated from the multi-layer bulk black phosphorous, according to embodiments of the subject invention.
FIG. 5(f) shows a selected area (electron) diffraction (SAD or SAED) image of the resulting single-layer (two-dimensional) or few-layer or even nano-platelets phosphorene exfoliated from the multi-layer bulk black phosphorous, according to an embodiment of the subject invention.
Figure 5B:
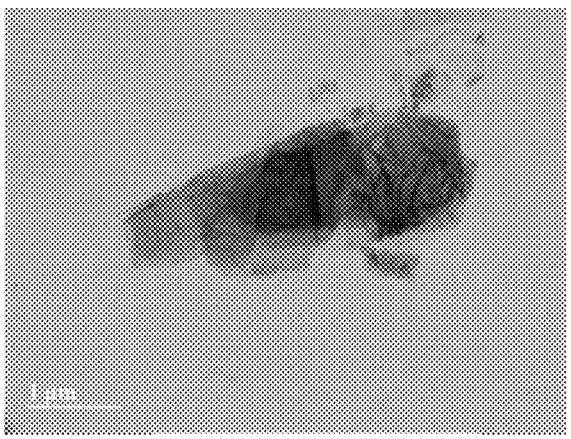
Figure 5C:
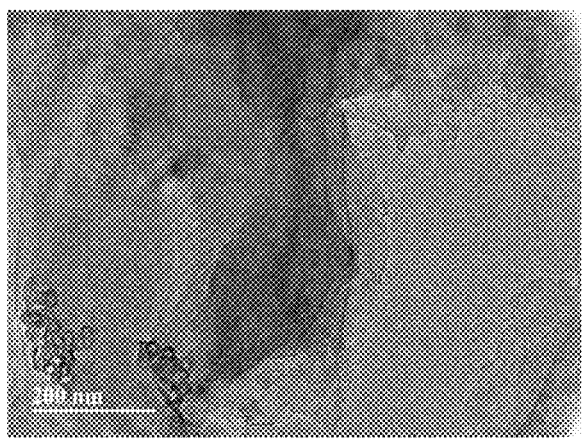
Figure 5D:
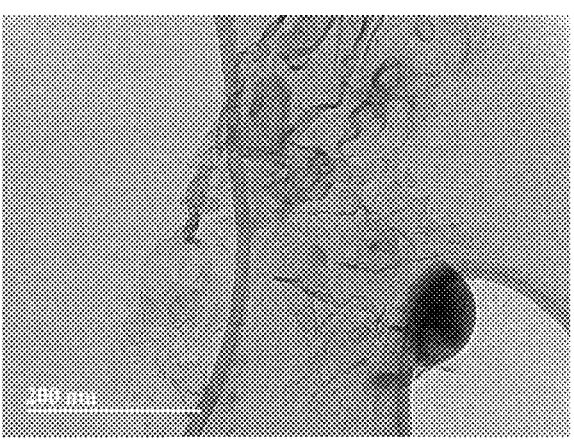
Figure 5E:
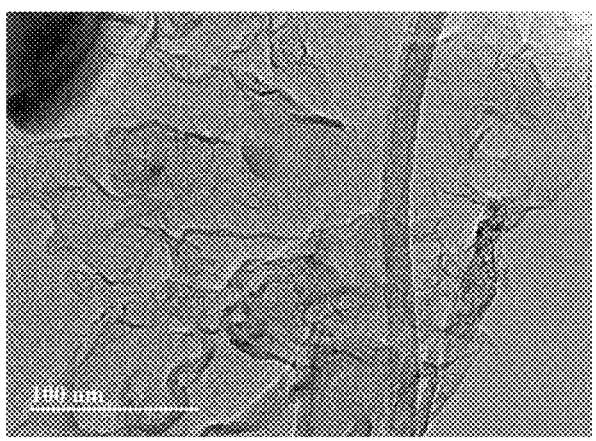
Figure 5F:
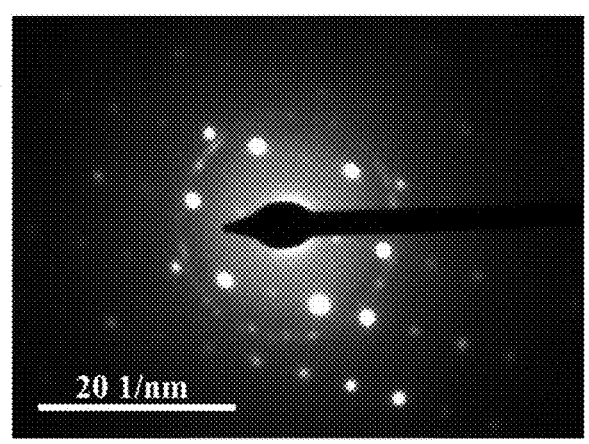

FIG. 4 shows Raman spectra of the multi-layer bulk black phosphorous of at least one bipolar electrode of the bipolar exfoliation system and the resulting single-layer (two-dimensional) or few-layer or even nano-platelets phosphorene exfoliated from the multi-layer bulk black phosphorous, respectively, according to an embodiment of the subject invention. The Raman spectrum from the multi-layer bulk black phosphorous shows three modes at about 362 $cm^{-1}$, about 437 $cm^{-1}$, and about 467 $cm^{-1}$, respectively. In comparison, the spectrum from the resulting single-layer (two-dimensional) or few-layer or even nano-platelets phosphorene exfoliated shows three similar modes at about 362 $cm^{-1}$ ($A^1_g$), about 439 $cm^{-1}$ ($B_{2g}$), and about 466 $cm^{-1}$ ($A_g^2$), respectively, confirming the possibility of utilizing the bipolar electrochemistry method to exfoliate bulk black phosphorous into phosphorene.

FIGS. 5(a-e) illustrate transmission electron microscopy (TEM) images of the resulting single-layer (two-dimensional) or few-layer or even nano-platelets phosphorene exfoliated from the multi-layer bulk black phosphorous, according to an embodiment of the subject invention. FIG. 5(f) illustrates a selected area (electron) diffraction (SAD or SAED) image of the resulting single-layer (two-dimensional) or few-layer or even nano-platelets phosphorene exfoliated from the multi-layer bulk black phosphorous, according to an embodiment of the subject invention. The selected area electron diffraction (SAED)) pattern of FIG. 5(f) confirms that phosphorene having a single-layer two-dimensional structure was obtained.

The exfoliated single-layer (two-dimensional) or few-layer or even nano-platelets phosphorene can be used in seminconductors, optoelectronics, supercapacitors, and batteries, as well as various biomedical applications. In particular, this technique is suitable for in situ synthesization and/or integration of two-dimensional phosphorene into micro/nanoplatforms that could be used as micro batteries and sensors.

Moreover, the wireless feature of the bipolar electrochemistry of embodiments of the subject invention allows for simultaneous control over numerous electrodes arranged in an array by exerting potential control over the solvent rather than over the individual electrodes for exfoliations of multi-layer bulk black phosphorous into single-layer (two-dimensional) or few-layer or even nano-platelets phosphorene. Because electrochemical reactions in multiple bipolar electrods can be controlled with only a single power supply, bipolar electrochemistry results in high-throughput applications.

In certain embodiments, because DI water with or without salts can be used as a solvent instead of an organic solvent such as N-methyl-2-pyrrolidone (NMP) or dimethylformamide (DMF), the bipolar exfoliation system offers an easy, safe, non-toxic, and reliable way to operate.

In certain embodiments, the bipolar exfoliation system and methods can be utilized to fabricate coatings on flat or complex surfaces and on porous three-dimensional structures, serving as ideal platforms for device applications.

In certain embodiments, the bipolar exfoliation system and methods can be scaled up to better fit the need of mass production of single-layer (two-dimensional) or few-layer or even nano-platelets phosphorene. Moreover, multiple bipolar electrodes can simultaneously be placed in the cell, and the bipolar exfoliation system and methods of the subject invention is capable of site-selective depositing and making composites of phosphorene with other 2D materials in layer by layer configuration or homogenous mixture.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A bipolar exfoliation system for single-step, in situ exfoliations of multi-layer bulk black phosphorous and deposition into single-layer, few-layer, or nano-platelets phosphorene, the system comprising:
   a first driving electrode;
   a second driving electrode electrically connected to the first driving electrode through an external power supply;
   at least one bipolar electrode comprising multi-layer bulk black phosphorous, the at least one bipolar electrode being disposed between the first driving electrode and the second driving electrode in a horizontal direction parallel to a lower surface of the first driving electrode; and
   a solvent in physical contact with the first driving electrode, the second driving electrode, and the at least one bipolar electrode, the solvent being deionized water without salts.

2. The bipolar exfoliation system according to claim 1, an electric field between the first and second driving electrodes being configured such that one end of the at least one bipolar electrode is turned into an anodic pole and the other end of the at least one bipolar electrode is turned into a cathodic pole.

3. The bipolar exfoliation system according to claim 2, the solvent being configured such that molecules of the solvent are oxidized at the anodic pole of the at least one bipolar electrode and the molecules of the solvent are reduced at the cathodic pole of the at least one bipolar electrode.

4. The bipolar exfoliation system according to claim 2, the at least one bipolar electrode being configured such that two faradaic reactions occur at at the anodic pole and the cathodic pole, respectively, of the at least one bipolar electrode.

5. The bipolar exfoliation system according to claim 2, the system being configured such that a magnitude of the electric field is configured such that the multi-layer black phosphorous is exfoliated into the single-layer, few-layer, or nano-platelets phosphorene.

6. The bipolar exfoliation system according to claim 2, the system being configured such that a direction of the electric field relative to the at least one bipolar electrode is configured such that the multi-layer black phosphorous is exfoliated into the single-layer, few-layer, or nano-platelets phosphorene.

7. The bipolar exfoliation system according to claim 1, the system being configured such that a potential between the first and second driving electrodes is configured such that the multi-layer black phosphorous is exfoliated into the single-layer, few-layer, or nano-platelets phosphorene.

8. The bipolar exfoliation system according to claim 1, the system being configured such that a distance between the first and second driving electrodes is configured such that the multi-layer black phosphorous is exfoliated into the single-layer, few-layer, or nano-platelets phosphorene.

9. The bipolar exfoliation system according to claim 1, the at least one bipolar electrode being physically separated from, and not in physical contact with, the external power supply.

10. The bipolar exfoliation system according to claim 1, the at least one bipolar electrode comprising a plurality of bipolar electrodes, and
the system being configured such that the electric field between the first driving electrode and the second driving electrodes is configured to simultaneously control each bipolar electrode of the plurality of bipolar electrodes.

11. The bipolar exfoliation system according to claim 1, the first driving electrode and the second driving electrode each being a stainless steel electrode.

12. A method of single-step, in situ exfoliation of multi-layer bulk black phosphorous and deposition into single-layer, few-layer, or nano-platelets phosphorene, the system comprising:
providing a bipolar exfoliation system, the system comprising:
a first driving electrode;
a second driving electrode electrically connected to the first driving electrode through an external power supply;
at least one bipolar electrode comprising the multi-layer bulk black phosphorous, the at least one bipolar electrode being disposed between the first driving electrode and the second driving electrode in a horizontal direction parallel to a lower surface of the first driving electrode; and
a solvent in physical contact with the first driving electrode, the second driving electrode, and the at least one bipolar electrode; and
configuring electric conditions between the first driving electrode and the second driving electrode such that one end of the at least one bipolar electrode is turned into an anodic pole and the other end of the at least one bipolar electrode is turned into a cathodic pole such that the multi-layer black phosphorous is exfoliated and deposited into the single-layer, few-layer, or nano-platelets phosphorene,
the exfoliating of the multi-layer black phosphorous and the depositing into, the single-layer, few-layer, or nano-platelets phosphorene being performed simultaneously, and
the solvent being deionized water without salts.

13. The method according to claim 12, configuring the electric conditions comprising configuring a magnitude of an electric field between the first driving electrode and the second driving electrode.

14. The method according to claim 12, configuring the electric conditions comprising configuring a direction of an electric field relative to the at least one bipolar electrode between the first driving electrode and the second driving electrode.

15. The method according to claim 12, configuring the electric conditions comprising configuring a potential between the first driving electrode and the second driving electrode.

16. The method according to claim 12, configuring the electric conditions comprising configuring a distance between the first driving electrode and the second driving electrode.

17. The method according to claim 12, the at least one bipolar electrode being physically separated from, and not in physical contact with, the external power supply.

18. The method according to claim 12, molecules of the solvent being oxidized at the anodic pole of the at least one bipolar electrode and reduced at the cathodic pole of the at least one bipolar electrode, and
two faradaic reactions occurring at the anodic pole and the cathodic pole, respectively, of the at least one bipolar electrode.

19. The method according to claim 12, the at least one bipolar electrode comprising a plurality of bipolar electrodes, and
each bipolar electrode of the plurality of bipolar electrodes being simultaneously controlled by the electric conditions between the first driving electrode and second driving electrode.

20. A method of single-step, in situ exfoliation of multi-layer bulk black phosphorous and deposition into single-layer, few-layer, or nano-platelets phosphorene, the method comprising:
providing a bipolar exfoliation system, the system comprising:
a first driving electrode;
a second driving electrode electrically connected to the first driving electrode through an external power supply;
at least one bipolar electrode comprising the multi-layer bulk black phosphorous, the at least one bipolar electrode being disposed between the first driving electrode and the second driving electrode in a horizontal direction parallel to a lower surface of the first driving electrode; and a solvent in physical contact with the first driving electrode, the second driving electrode, and the at least one bipolar electrode; and configuring electric conditions between the first driving electrode and the second driving electrode such that one end of the at least one bipolar electrode is turned into an anodic pole and the other end of the at least one bipolar electrode is turned into a cathodic pole such that the multi-layer black phosphorous is exfoliated and deposited into the single-layer, few-layer, or nano-platelets phosphorene, configuring the electric conditions comprising the following:
- configuring a magnitude of an electric field between the first driving electrode and the second driving electrode;
- configuring a direction of the electric field relative to the at least one bipolar electrode between the first driving electrode and the second driving electrode;
- configuring a potential between the first driving electrode and the second driving electrode; and
- configuring a distance between the first driving electrode and the second driving electrode, the at least one bipolar electrode being physically separated from, and not in physical contact with, the external power supply, the solvent being deionized water without salts, molecules of the solvent being oxidized at the anodic pole of the at least one bipolar electrode and reduced at the cathodic pole of the at least one bipolar electrode, two faradaic reactions occurring at the anodic pole and the cathodic pole, respectively, of the at least one bipolar electrode, the at least one bipolar electrode comprising a plurality of bipolar electrodes, each bipolar electrode of the plurality of bipolar electrodes being simultaneously controlled by the electric conditions between the first driving electrode and second driving electrode, the exfoliating of the multi-layer black phosphorous and the depositing into the single-layer, few-layer, or nano-platelets phosphorene being performed simultaneously, and the first driving electrode and the second driving electrode each being a stainless steel electrode.

* * * * *